United States Patent
Park et al.

(10) Patent No.: US 11,243,604 B2
(45) Date of Patent: Feb. 8, 2022

(54) METHOD OF PERFORMING DYNAMIC VOLTAGE AND FREQUENCY SCALING BASED ON POWER STEP

(71) Applicant: SAMSUNG ELECTRONICS CO., LTD., Suwon-si (KR)

(72) Inventors: Jonglae Park, Anyang-si (KR); Youngtae Lee, Seoul (KR); Choonghoon Park, Seoul (KR); Hyunchul Seok, Suwon-si (KR); Kwanjin Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/861,383

(22) Filed: Apr. 29, 2020

(65) Prior Publication Data
US 2021/0081027 A1 Mar. 18, 2021

(30) Foreign Application Priority Data
Sep. 16, 2019 (KR) .................. 10-2019-0113697

(51) Int. Cl.
*G06F 1/00* (2006.01)
*G06F 1/3296* (2019.01)
*G06F 1/324* (2019.01)

(52) U.S. Cl.
CPC ............ *G06F 1/3296* (2013.01); *G06F 1/324* (2013.01)

(58) Field of Classification Search
CPC .............................. G06F 1/324; G06F 1/3296
See application file for complete search history.

(56) References Cited

U.S. PATENT DOCUMENTS

| | | |
|---|---|---|
| 7,149,913 B2 | 12/2006 | Barr et al. |
| 8,631,262 B2 | 1/2014 | Park |
| 8,661,276 B2 | 2/2014 | Park et al. |
| 9,037,882 B2 | 5/2015 | Vadakkanmaruveedu et al. |
| 9,239,614 B2 | 1/2016 | Park |
| 9,720,492 B2 | 8/2017 | Park |
| 10,394,312 B2 | 8/2019 | Park |
| 2007/0156370 A1* | 7/2007 | White ................... G06F 1/3203 702/132 |
| 2015/0026398 A1* | 1/2015 | Kim ...................... G06F 13/102 711/105 |

(Continued)

FOREIGN PATENT DOCUMENTS

| | | |
|---|---|---|
| JP | 2015-109010 | 6/2015 |
| KR | 10-1574433 | 11/2015 |
| KR | 10-1600287 | 2/2016 |

(Continued)

*Primary Examiner* — Nitin G Patel
(74) *Attorney, Agent, or Firm* — F. Chau & Associates, LLC

(57) ABSTRACT

Dynamic voltage and frequency scaling (DVFS) is performed based on a power step by setting a plurality of power levels corresponding to a plurality of available frequencies of a clock signal for an operation of a processor, setting a plurality of power steps corresponding to the plurality of available frequencies, and controlling a conversion between the plurality of power levels based on a utilization of the processor and the plurality of power steps. Performance and power consumption of a processor are controlled efficiently by performing power level conversion based on the power step.

20 Claims, 17 Drawing Sheets

(56) References Cited

U.S. PATENT DOCUMENTS

2015/0161307 A1 6/2015 Ueki

FOREIGN PATENT DOCUMENTS

| KR | 10-1617377 | 4/2016 |
| KR | 10-1620103 | 5/2016 |
| KR | 10-1655030 | 8/2016 |
| KR | 10-1666549 | 10/2016 |

* cited by examiner

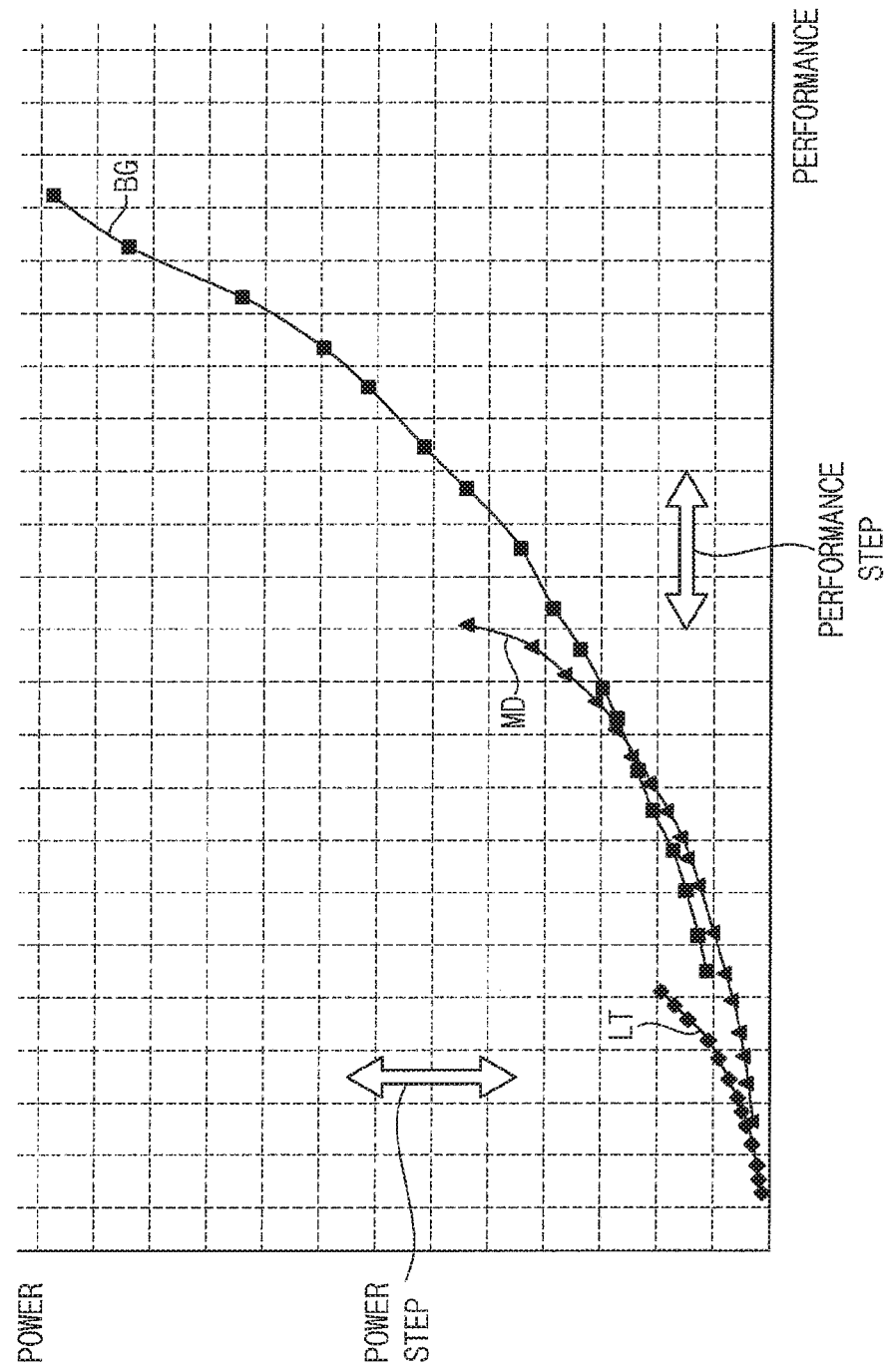

FIG. 16

| Benchmark | CPER | | UXPER | | DoU |
|---|---|---|---|---|---|
| | GeekBench Single | GeekBench Multi | PCMark | AppLaunch | |
| PSF | 0.20 | 0.50 | 5.30 | 7.00 | 1.04 |

METHOD OF PERFORMING DYNAMIC VOLTAGE AND FREQUENCY SCALING BASED ON POWER STEP

CROSS-REFERENCE TO RELATED APPLICATIONS

This application claims priority under 35 U.S.C. § 119 to Korean Patent Application No. 10-2019-0113697, filed on Sep. 16, 2019 in the Korean Intellectual Property Office (KIPO), the disclosure of which is incorporated by reference herein in its entirety.

TECHNICAL FIELD

Exemplary embodiments relate generally to semiconductor integrated circuits, and more particularly to a method of performing dynamic voltage and frequency scaling (DVFS) based on a power step.

DISCUSSION OF THE RELATED ART

As the integration degree of components integrated in a single chip in a semiconductor device increases, and as the operation speed of the semiconductor device is gradually increased, it becomes desirable to reduce power consumption of the semiconductor device. Unnecessary power consumption may be caused, for example, when a semiconductor device such as a processor operates with a high frequency regardless of an operation status of the processor. To reduce such unnecessary power consumption, an operation voltage and/or a frequency of an operation clock signal may be changed. However, the change of the voltage and/or the frequency may degrade the stability and performance of a system including the processor. To balance power consumption and performance, a dynamic voltage and frequency scaling (DVFS) scheme may be adopted to change the operation frequency and the operation voltage reflecting the operation status of the semiconductor device.

SUMMARY

Exemplary embodiments may provide a method of performing dynamic voltage and frequency scaling (DVFS) for efficient control of power consumption and performance.

Exemplary embodiments may provide a computing system performing the method.

According to exemplary embodiments, a method of performing DVFS includes setting a plurality of power levels corresponding to a plurality of available frequencies of a clock signal for an operation of a processor, setting a plurality of power steps corresponding to the plurality of available frequencies, and controlling a conversion between the plurality of power levels based on a utilization of the processor and the plurality of power steps.

According to exemplary embodiments, a computing system includes a processor comprising at least one processor core, a power management circuit configured to provide a clock signal and a voltage for an operation of the processor, and a memory storing a DVFS computer program. The processor is configured to execute the DVFS computer program to set a plurality of power levels corresponding to a plurality of available frequencies of the clock signal for the operation of the processor, set a plurality of power steps corresponding to the plurality of available frequencies, and control a conversion between the plurality of power levels based on a utilization of the processor and the plurality of power steps.

According to exemplary embodiments, a method of performing DVFS includes setting a plurality of power levels corresponding to a plurality of available frequencies of a clock signal for an operation of a processor, setting a plurality of power steps corresponding to the plurality of available frequencies based on at least one of an operation temperature of the processor and an available power of the processor, determining a power target frequency based on a current utilization of the processor and a current power step corresponding to a current power level determined from among the plurality of power levels, and determining a next power level from among the plurality of power levels based on the power target frequency.

The method of performing the DVFS and the computing system performing the method according to exemplary embodiments may control performance and power consumption of a processor efficiently by performing power level conversion based on the power step.

BRIEF DESCRIPTION OF THE DRAWINGS

The above and other features of the present disclosure will become more apparent by describing in detail exemplary embodiments thereof with reference to the accompanying drawings, in which:

FIGS. 2A and 2B are diagrams for describing a power level and a power step according to exemplary embodiments.

FIG. 16 is a diagram illustrating effects of a method of performing DVFS according to exemplary embodiments.

DETAILED DESCRIPTION OF THE EXEMPLARY EMBODIMENTS

Figure 1:
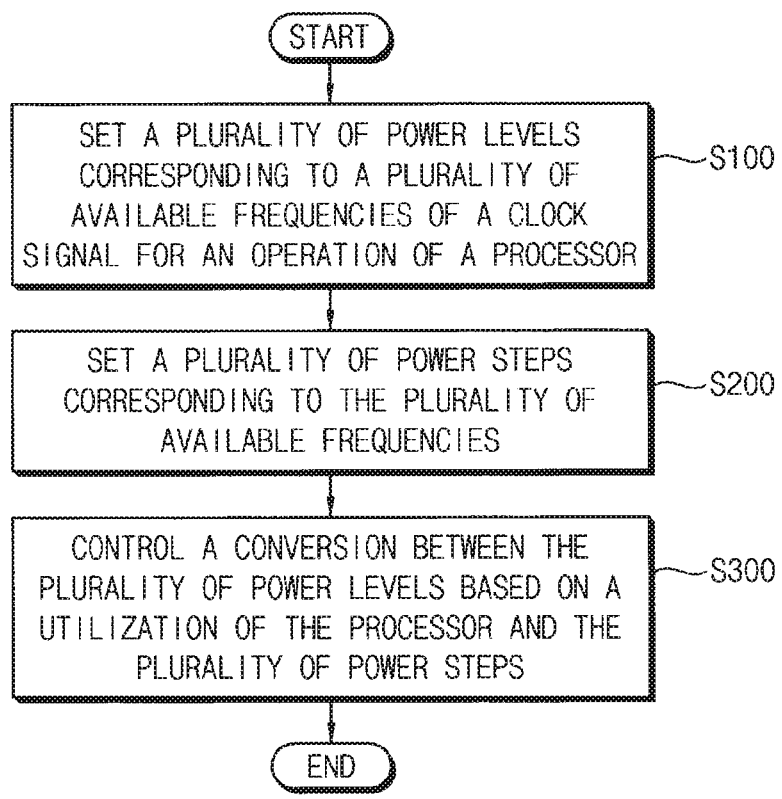
FIG. 1 is a flowchart illustrating a method of performing dynamic voltage and frequency scaling (DVFS) according to exemplary embodiments.

Exemplary embodiments will be described more fully hereinafter with reference to the accompanying drawings. Like reference numerals may refer to like elements throughout the accompanying drawings, and repeated descriptions may be omitted.

Figure 2A:
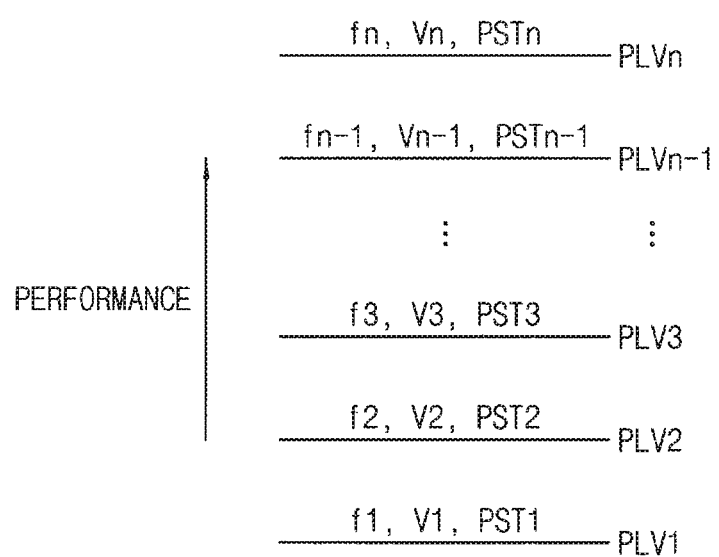

FIG. 1 is a flowchart illustrating a method of performing dynamic voltage and frequency scaling (DVFS) according to exemplary embodiments. FIGS. 2A and 2B are diagrams for describing a power level and a power step according to exemplary embodiments.

Referring to FIG. 1, a plurality of power levels may be set, which correspond to a plurality of available frequencies of a clock signal for an operation of a processor (S100). A plurality of power steps may be set, which correspond to the plurality of available frequencies (S200). A conversion, for example, a power level conversion, between the plurality of power levels may be controlled based on a utilization of the processor and the plurality of power steps (S300).

FIG. 2A illustrates first through n-th available frequencies f1~fn of an operation clock signal, first through n-th operation voltages V1~Vn, and first through n-th power steps PST1~PSTn, which respectively correspond to first through n-th power levels PLV1~PLVn, where n is a natural number.

In this disclosure, a power level indicates a degree of power consumption of a processor and/or performance of the processor. When the processor performs the same work or application, the power consumption and the performance of the processor may be increased as the power level is increased, as illustrated in FIG. 2A.

For example, a frequency of an operation clock signal provided to the processor may be increased as the power level is increased. In general, most power consumption corresponds to dynamic power that is consumed when signals are switched in a digital logic circuit, for example, when the logic level of the signals such as the operation clock signal transition from a logic high level to a logic low level, and vice versa. As a result, the power consumption of the processor may be increased as the frequency of the operation clock signal is increased. Accordingly, the entire power consumption may be increased unnecessarily if the operation clock signal of an excessively high frequency and/or the operation voltage of an excessively high level are provided to the processor.

The power level scaling may be performed by controlling the operation voltage with controlling the operation frequency. As the operation frequency is increased, the operation voltage is increased to support switching speeds of devices such as, for example, transistors. In general, the power consumption is increased as the operation voltage is increased.

The operation voltage and the operation frequency provided to the processor may be changed using, for example, a voltage regulator, a phase-locked loop (PLL), etc. The available frequencies of the operation clock signal may have discrete values that are determined according to a configuration of a digital clock generator. Even though exemplary embodiments described herein refer to the available frequencies having discrete values, exemplary embodiments are not limited thereto. For example, in exemplary embodiments, the available frequency may have continuous values depending on a configuration of an analog clock generator.

A workload rate or a utilization of a processor may be defined as a ratio of a current work amount that is processed currently by the processor to a maximum work amount that may be performed by the processor. The utilization may be measured using various methods known to those skilled in the art. The utilization may be measured non-periodically when it is necessary, or periodically by a fixed unit period.

The power step is used to predict a future power level or operation frequency according to exemplary embodiments. The power step indicates an amount of power change corresponding to an amount of frequency change that may be implemented at a current power level. The power step may be set to the same value with respect to all power levels as described below with reference to FIGS. 5A and 5B, or the power step may be set to different values depending on the power levels as will be described below with reference to FIG. 7.

The method and the system according to exemplary embodiments adopt a prediction model of a future frequency based on power and performance, whereas conventional schemes are typically based only on performance and utilization, and do not take power into consideration. According to exemplary embodiments, the DVFS may be performed with higher responsiveness and lower power consumption regardless of the conventional heuristic tuning tasks.

Conventional DVFS schemes typically use the utilization of a processor as a performance-based prediction model without taking power into consideration. However, power is a substantial restriction in providing the required performance of the processor, as limited power may adversely affect thermal characteristics and battery time in a mobile device.

In addition, conventional DVFS schemes typically have insufficient grounds for prediction when the utilization of the processor approaches the maximum value. When the resent utilization, which is basis of the prediction of the future frequency, approaches 100% at a time point of judging the DVFS, conventional DVFS schemes determine the future frequency using very heuristic methods. For example, the frequency has been jumped to a predetermined value which is set based on various tests of performance, responsiveness, operation current, etc. The future frequency may be determined by a user input or determined based on a changing rate of the utilization of the processor according to conventional DVFS schemes. A shortcoming of such conventional DVFS schemes is that a tuning parameter set for mass production of a semiconductor device may be obtained by trial-and-error schemes with long time and high cost.

The entire power consumed by the processor may include a dynamic power and a static power, and the dynamic power Pdynamic may be represented by Expression 1.

$$P\text{dynamic} = C * f * V^2 \qquad \text{Expression 1}$$

In Expression 1, f indicates the operation frequency, V indicates the operation voltage, and C indicates a capacitance value which is determined depending on a load of the processor.

Malfunction of the processor may be caused if the operation frequency is increased alone with the fixed operation voltage. Thus, the operation voltage may be changed with the operation frequency by a relation represented by Expression 2.

$$f \propto (V - Vth)^m \beta / V \qquad \text{Expression 2}$$

In Expression 2, Vth indicates a threshold voltage of a transistor included in the processor, and β indicates a technology-dependent constant having value of about 1.5. When the operation voltage is sufficiently high and β has a value of 2, the dynamic power may be represented by Expression 3.

$$P\text{dynamic} \propto f^{<\text{JBEGINITAL}m}{}_3 \propto f^{<\text{JBEGINITAL}m}{}_3 \quad \text{Expression 3}$$

As shown in Expression 3, the dynamic power increases exponentially according to the operation frequency, and thus, the dynamic power is increased more in the high frequency region than in the lower frequency region. For example, the cost for increase of performance may be increased further in the high frequency region.

Recently, the importance of user experience has increased, which is often related more with responsiveness rather than throughput. A ramp-up time taken for increasing the operation frequency has an important role in improving responsiveness.

FIG. 2B illustrates a relation between performance and power consumption (e.g., dynamic power) with respect to a system on chip (SoC) comprised of three clusters BG, MD and LT having different performance. As shown in FIG. 3A, the power is increased exponentially according to the performance.

A conventional DVFS predicts future performance based on a performance step. If the utilization of the processor at the current operation frequency f'm is relatively low far from the maximum utilization (e.g., 100%), the future operation frequency f'm+1 may be predicted as Expression 4.

$$f'm+1 = K*Um*f'm \quad \text{Expression 4}$$

In Expression 4, K is a constant related with a margin rate and Um indicates a current utilization of the processor. If the margin rate is set to 25%, K becomes 1.25.

Such a prediction model may yield reasonable results if the system behavior has a temporal locality, that is, if the system behavior has a sufficient consistency over time.

In general, the prediction of the future operation frequency f'm+1 may be performed as Expression 5, when the utilization approaches 100%.

$$f'm+1 = H \text{ or } \sigma*f'm \quad \text{Expression 5}$$

In Expression 5, H indicates a predetermined frequency and σ indicates a predetermined ratio.

A problem of the above two modes is that, when the utilization approaches 100%, the actually required future performance may be 100% or 1000%. The 100% utilization may indicate only an insufficiency of performance, but may not provide information on the degree of the required future performance. A conventional DVFS is performed as Expression 5 due to such uncertainty, and the predetermined value H and σ may be obtained heuristically. Uniform application of the heuristic values may not secure efficiency of the DVFS considering various operation states or environments.

In comparison with the conventional schemes of predicting future performance based on the performance step, the method according to exemplary embodiments predicts the future performance based on the power step.

In exemplary embodiments, a power target frequency may be determined based on a current utilization of the processor and a current power step corresponding to a current power level determined among the plurality of power levels, and then a next power level may be determined among the plurality of power levels based on the power target frequency.

The power target frequency corresponds to a prediction result of a future performance. Accordingly, candidate frequencies may be determined among the plurality of available frequencies such that the candidate frequencies are greater than the power target frequency, and then the power level corresponding to a minimum frequency among the candidate frequencies may be determined as the next power level.

When the power levels and the power steps are set as illustrated in FIG. 2A, if the power target frequency is greater than the second available frequency f2 and smaller than the third available frequency f3, the third through n-th available frequencies f3~Fn correspond to the candidate frequencies and the third power level PLV3 corresponding to the third available frequency f3, that is the minimum frequency among the candidate frequencies, may be determined as the next power level. For example, if the determined power target frequency is 2.15 GHz, and the available frequencies corresponding to the candidate frequencies are 2.2 GHz, 2.3 GHz and 2.4 GHz, the minimum frequency of 2.2 GHz may be determined as the next operation frequency. If the available frequency has continuous values, the next operation frequency may be determined as the power target frequency (e.g., may be set to itself at 2.15 GHz).

In exemplary embodiments, the power target frequency fm+1 corresponding to the prediction result of the future performance may be determined as Expression 6.

$$fm+1 = \text{PtoF}(\{\text{FtoP}(fm)+\text{PSTm}\}*Um) \quad \text{Expression 6}$$

In Expression 6, fm indicates the available frequency corresponding to the current power level PLVm, PSTm indicates the power step corresponding to the current power level PLVm, and Um indicates the current utilization of the processor. PtoF( ) indicates a function for converting a power to a frequency, and FtoP( ) indicates a function for converting a frequency to a power. For example, the functions PtoF( ) and FtoP( ) may be determined using the relation represented by Expression 1.

Referring to Expression 6, a maximum power FtoP(fm) at the current power level PLVm may be determined, which indicates the power consumption when the utilization is 100% at the current available frequency or the current operation frequency. A margin power may be determined as a sum of the maximum power FtoP(fm) and the current power step PSTm. A target power may be determined as a multiplication of the margin power FtoP(fm)+PSTm and the current utilization Um. The power target frequency may be determined as a frequency corresponding to the target power, that is, PtoF({FtoP(fm)+PSTm}*Um) as represented by Expression 6.

As such, the method of performing the DVFS and the computing system performing the method according to exemplary embodiments may control performance and power consumption of a processor efficiently by performing power level conversion based on the power step.

Figure 3:
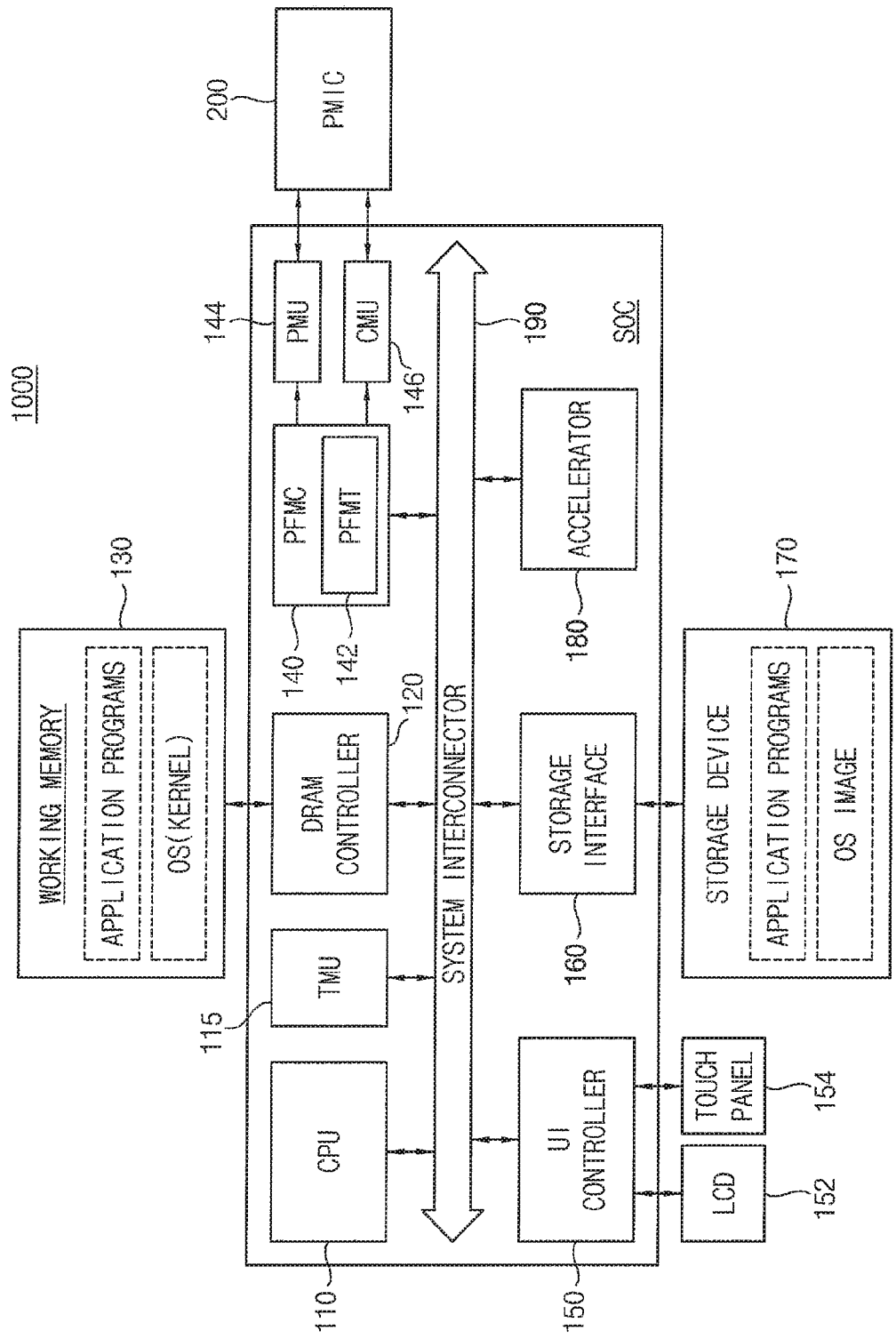
FIG. 3 is a block diagram illustrating a computing system according to exemplary embodiments.

FIG. 3 is a block diagram illustrating a computing system according to exemplary embodiments.

Referring to FIG. 3, the computing system 1000 may include a system on chip (SoC), a working memory 130, a display device (e.g., an LCD) 152, a touch panel 154, a storage device 170, and a power management integrated circuit (PMIC) 200. The SoC may include a central processing unit (CPU) 110, a temperature management unit (TMU) 115, a DRAM controller 120, a performance controller (PFMC) 140, a user interface controller (UI controller) 150, a storage interface 160, an accelerator 180, a power management unit (PMU) 144, and a clock management unit (CMU) 146. It will be understood that components of the computing system 1000 are not limited to the components shown in FIG. 3. For example, the computing system 1000 may further include, for example, a hardware codec for processing image data, a security block, and other components.

The processor 110 executes software (for example, an application program, an operating system (OS), and device drivers) for the computing system 1000. The processor 110 may execute the operating system (OS), which may be loaded into the working memory 130. The processor 110 may execute various application programs to be driven on the operating system (OS). The processor 110 may be provided as a homogeneous multi-core processor or a heterogeneous multi-core processor. In this case, the computing system 1000 may be referred to as a multi-core system. A multi-core processor is a computing component including at least two independently drivable processors (hereinafter referred to as "cores" or "processor cores"). Each of the cores may independently read and execute program instructions.

The processor cores of the processor 110 may be grouped into a plurality of clusters that operate based on independent operation clock signals and operation voltages, respectively. For example, the processor cores in the same cluster may be included in a clock domain operating based on the same operation clock signal and a power domain operating based on the same operation voltage.

The operation voltage and the operation clock provided to each of the processor cores may be cut off or connected in units of single cores. An operation of cutting off the driving voltage and the driving clock provided to each of the power domains from a specific core may be referred to as "hotplug-out". An operation of providing the driving voltage and the driving clock to a specific core may be referred to as "hotplug-in". In addition, a frequency of the operation clock and a level of the operation voltage provided to each of the power domains may vary depending on a processing load of each core. For example, as the time required for processing tasks becomes longer, each of the cores may be controlled by means of DVFS that increases the frequency of the operation clock or the level of the operation voltage provided to a corresponding power domain. According to an exemplary embodiment, hotplug-in and hotplug-out may be performed with reference to the level of the operation voltage and the frequency of the operation clock of the processor 110 adjusted through DVFS.

A kernel of the operating system (OS) may monitor the number of tasks in a task queue and the driving voltage and the driving clock of the processor 110 at specific time intervals to control the processor 110. In addition, a kernel of the operating system (OS) may control hotplug-in or hotplug-out of the processor 110 with reference to the monitored information.

The DRAM controller 120 provides interfacing between the working memory 130 and the system-on-chip (SoC). The DRAM controller 120 may access the working memory 130 according to a request of the processor 110 or another intellectual property (IP) block. For example, the DRAM controller 120 may write data into the working memory 130 according to a write request of the processor 110. Alternatively, the DRAM controller 120 may read data from the working memory 130 according to a read request of the processor 110 and transmit the read data to the processor 110 or the storage interface 160 through a data bus.

The operating system (OS) or basic application programs may be loaded into the working memory 130 during a booting operation. For example, an OS image stored in the storage device 170 may be loaded into the working memory 130 based on a booting sequence during booting of the computing system 1000. Overall input/output operations of the computing system 1000 may be supported by the operating system (OS). Similarly, application programs may be loaded into the working memory 130 to be selected by a user or to provide a basic service. Moreover, the working memory 130 may be used as a buffer memory to store image data provided from an image sensor such as, for example, a camera. The working memory 130 may be a volatile memory such as, for example, a static random access memory (SRAM) and a dynamic random access memory (DRAM), or a nonvolatile memory device such as, for example, a phase-change random-access memory (PRAM), a magnetoresistive random-access memory (MRAM), a resistive random-access memory (ReRAM), a ferroelectric random-access memory (FRAM), and a NOR flash memory.

The performance controller 140 may adjust operation parameters of the system-on-chip (SoC) according to a control request provided from the kernel of the operating system (OS). For example, the performance controller 140 may adjust the level of DVFS to enhance performance of the system-on-chip (SoC). Alternatively, the performance controller 140 may control a driving mode of a multi-core processor such as Big.LITTLE (a heterogeneous computing architecture developed by ARM Holdings) of the processor 110 according to a request of the kernel. In this case, the performance controller 140 may include a performance table (PFMT) 142 to set a driving voltage and a frequency of a driving clock therein. The performance controller 140 may control the PMU 144 and the CMU 146, which together form the power managing circuit, connected to the PMIC 200 to provide the determined driving voltage and the determined driving clock to each power domain.

The temperature management unit (TMU) 115 may generate control signals for dynamic thermal management (DTM) based on temperature information provided from a temperature sensor included in the computing system 1000.

In an electronic device such as a mobile electronic device, a temperature of a semiconductor chip and a temperature of a surface of a housing case may be increased due to heat generated by operation of the electronic device. The increase of the temperature of the semiconductor chip may cause malfunction, reliability degradation, lifetime reduction, etc. The increase of the temperature of the case surface may cause burn or displeasure of a user. To optimize and operate an electronic device including an integrated circuit or a semiconductor chip, the DTM scheme may be adopted such that the operation of the semiconductor chip in the electronic device may be automatically stopped by temperature control software when an operational temperature of the semiconductor chip is increased over a predetermined target temperature.

For example, according to the DTM scheme, a target temperature of the semiconductor chip and/or a target temperature of the housing case may be set in advance, and the temperature monitor management unit (TMU) 115 may generate the control signals to restrict performance or a power level of the semiconductor chip if the operational temperature of the semiconductor chip exceeds the predetermined target temperature and/or if the operational temperature of the housing case exceeds the predetermined target temperature.

The user interface controller 150 controls user input and output from user interface devices. For example, the user interface controller 150 may display a keyboard screen for inputting data to the LCD 152 according to the control of the processor 110. Alternatively, the user interface controller 150 may control the LCD 152 to display data that a user requests. The user interface controller 150 may decode data provided from user input means such as, for example, the touch panel 154, into user input data.

The storage interface 160 accesses the storage device 170 according to a request of the processor 110. For example, the storage interface 160 provides interfacing between the system-on-chip (SoC) and the storage device 170. For example, data processed by the processor 110 is stored in the storage device 170 through the storage interface 160. Alternatively, data stored in the storage device 170 may be provided to the processor 110 through the storage interface 160.

The storage device 170 is provided as a storage medium of the computing system 1000. The storage device 170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 170 may include a next-generation nonvolatile memory such as, for example, PRAM, MRAM, ReRAM, and FRAM or a NOR-type flash memory. According to an exemplary embodiment, the storage device 170 may be an embedded memory incorporated in the system-on-chip (SoC).

The accelerator 180 may be provided as a separate intellectual property (IP) block to increase processing speed of multimedia data. For example, the accelerator 180 may be provided as an intellectual property (IP) block to improve processing performance of text, audio, still images, animation, video, two-dimensional data or three-dimensional data.

A system interconnector 190 may be a system bus to provide an on-chip network in the system-on-chip (SoC). The system interconnector 190 may include, for example, a data bus, an address bus, and a control bus. The data bus is a data transfer path. A memory access path to the working memory 130 or the storage device 170 may also be provided. The address bus provides an address exchange path between intellectual property (IP) blocks. The control bus provides a path along which a control signal is transmitted between intellectual property (IP) blocks. However, the configuration of the system interconnector 190 is not limited to the above description, and the system interconnector 190 may further include arbitration means for efficient management.

The modules illustrated in FIG. 3 may be physically implemented by electronic (or optical) circuits such as, for example, logic circuits, discrete components, microprocessors, hard-wired circuits, memory elements, wiring connections, etc., which may be formed using semiconductor-based fabrication techniques or other manufacturing technologies. In the case of the modules being implemented by microprocessors or similar, they may be programmed using software (e.g., microcode) to perform various functions discussed herein and may optionally be driven by firmware and/or software. Alternatively, each module may be implemented by dedicated hardware, or as a combination of dedicated hardware to perform some functions and a processor (e.g., one or more programmed microprocessors and associated circuitry) to perform other functions.

Figure 4:
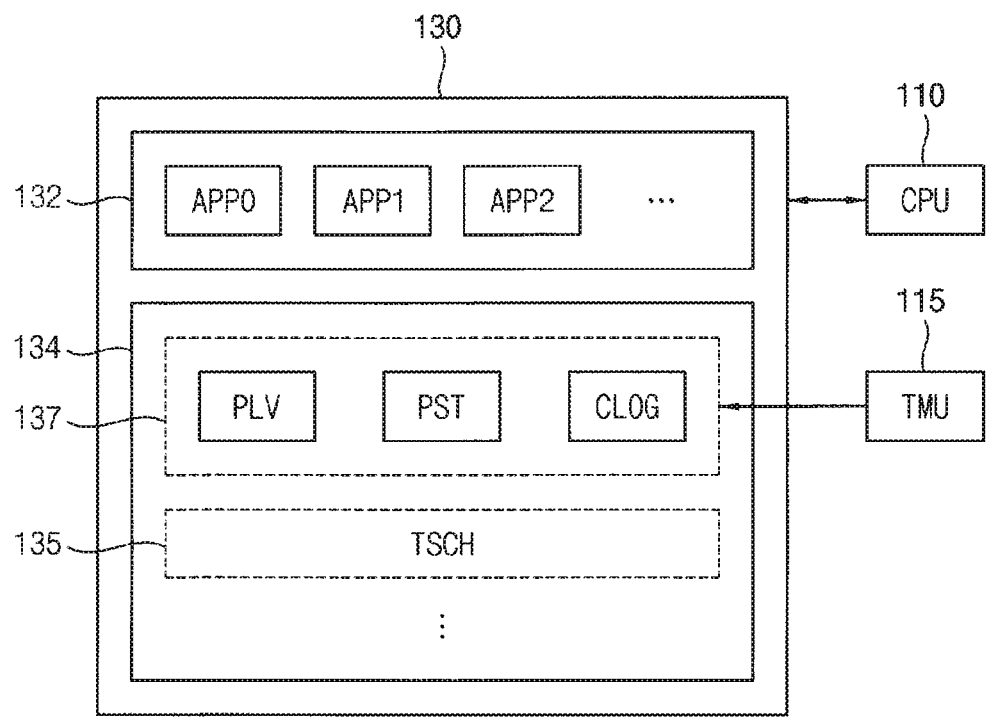
FIG. 4 is a diagram illustrating a DVFS module implemented in a working memory of the computing system of FIG. 3 according to exemplary embodiments.

FIG. 4 is a diagram illustrating a DVFS module implemented in the working memory 130 of the computing system of FIG. 3 according to exemplary embodiments.

FIG. 4 illustrates a software structure included in the computing system 1000 shown in FIG. 3. In exemplary embodiments, a DVFS module may be loaded into the working memory 130 and executed by the processor 110. According to exemplary embodiments, the DVFS module according to exemplary embodiments may be implemented as software, hardware or a combination of software and hardware.

Referring to FIG. 4, a software layer structure included in the computing system 1000 loaded into the working memory 130 and driven by the CPU 110 may be divided into an application program 132 and a kernel 134. The operating system (OS) may further include one or more device drivers to manage various devices such as, for example, a memory, a modem, and an image processing device.

The application program 132 may be upper layer software driven as a basic service or driven by a user's request. A plurality of application programs App0, App1 and App2 may be simultaneously executed to provide various services. The application programs App0, App1 and App2 may be executed by the CPU 110 after being loaded into the working memory 130. For example, when playing a video file requested by the user, an application program (e.g., video player) may be executed to play the video file. Then, the executed player may generate a read request or a write request to the storage device 170 to play the video file requested by the user.

The kernel 134, as a component of the operating system (OS), performs a control operation between the application program 132 and hardware. The kernel 134 may include, for example, program execution, interrupt, multi-tasking, memory management, a file system, and a device driver. A scheduler (TSCH) 135 and the DVFS module 137 may be provided as a portion of the kernel 134.

The scheduler or the task scheduler (TSCH) 135 monitors and manages a task queue for each of the processor cores. The task queue is a queue of active tasks when a plurality of tasks are simultaneously performed. For example, tasks existing in the task queue may be quickly processed by the processor 110, as compared to other tasks. The scheduler 135 may determine a subsequent process with reference to task information loaded into the task queue. For example, the scheduler 135 may determine the priority of CPU resources according to a value of the task queue. In a LINUX kernel, a plurality of task queues correspond to a plurality of processor cores, respectively.

The scheduler 135 may assign the tasks respectively corresponding to the task queues to corresponding cores, respectively. A task loaded into the task queue to be performed by the processor 110 may be referred to as a runnable task.

The DVFS module 137 may perform the DVFS based on the power step as described above. The DVFS module 137 may store a plurality of power levels PLV corresponding to a plurality of available frequencies of an operation clock signal. In addition, the DVFS module 137 may set and store a plurality of power steps PST corresponding to the plurality of available frequencies. Control logic CLOG of the DVFS module 137 may control the conversion between the plurality of power levels PLV based on the utilization of the processor 110 and the plurality of power steps PST.

In exemplary embodiments, as will be described below with reference to FIG. 9, the DVFS module 137 may adjust the plurality of power steps PST based on the temperature information or the control signals from the temperature management unit (TMU) 115.

Figure 5A:
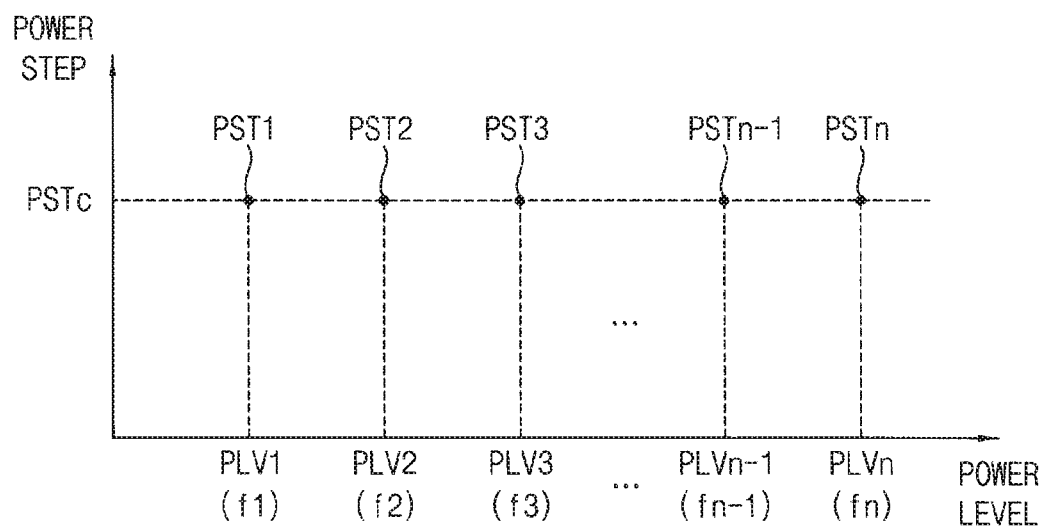
FIGS. 5A, 5B and 5C are diagrams illustrating a method of setting a plurality of power steps according to exemplary embodiments.
Figure 5B:
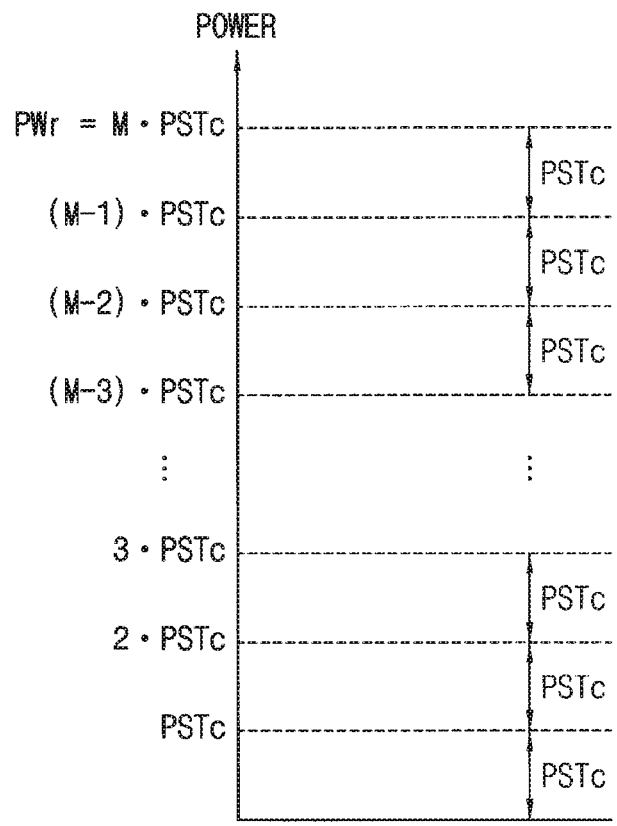
Figure 5C:
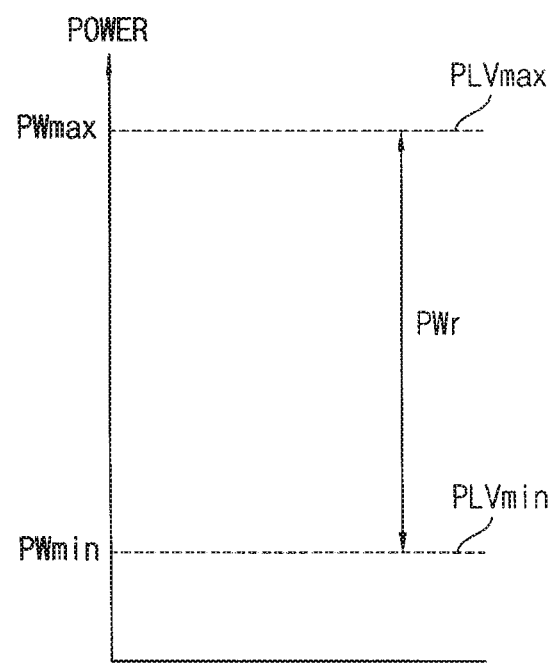

FIGS. 5A, 5B and 5C are diagrams illustrating a method of setting a plurality of power steps according to exemplary embodiments.

Referring to FIGS. 5A, 5B and 5C, all of the power steps PST1~PSTn of FIG. 2A may be set as a common power step PSTc. In exemplary embodiments, as illustrated in FIGS. 5A and 5B, a reference power PWr may be set and the common power step PSTc may be set to a value equal to the reference power PWr divided by M, where M is a natural number.

The reference power PWr may be determined based on a power budget that is permitted depending on the power that may be supplied by a power management circuit and/or thermal condition. For example, the reference power PWr may be determined based on at least one of the operation temperature of the processor and the available power of the processor.

In exemplary embodiments, as illustrated in FIG. 5C, a maximum power level PWmax/PLVmax and a minimum power level PWmin/PLVmin may be determined according to the power budget, and a power difference between the maximum power level PWmax/PLVmax and the minimum power level PWmin/PLVmin may be determined as the reference power PWr. For example, in the case of a mobile device that is powered by an embedded battery, as the remaining electric energy of the battery is decreased, the maximum power level PWmax/PLVmax, and thus the reference power PWr, may be decreased.

The power budget may be predetermined according to the available power, and the reference power PWr may be determined depending on the power budget. For example, if the operation temperature is increased excessively, the maximum power level PWmax/PLVmax may be set to a lower value, and thus the reference level PWr may be decreased.

The value of M corresponding to PWr/PSTc is a factor of responsiveness. As the value of M is increased, the power step is decreased and the ramp-up time is increased. For example, as the value of M is increased, the responsiveness or the speed of the power level conversion is decreased.

As a result, the speed of the power level conversion may be controlled by adjusting the value of M.

Figure 6:
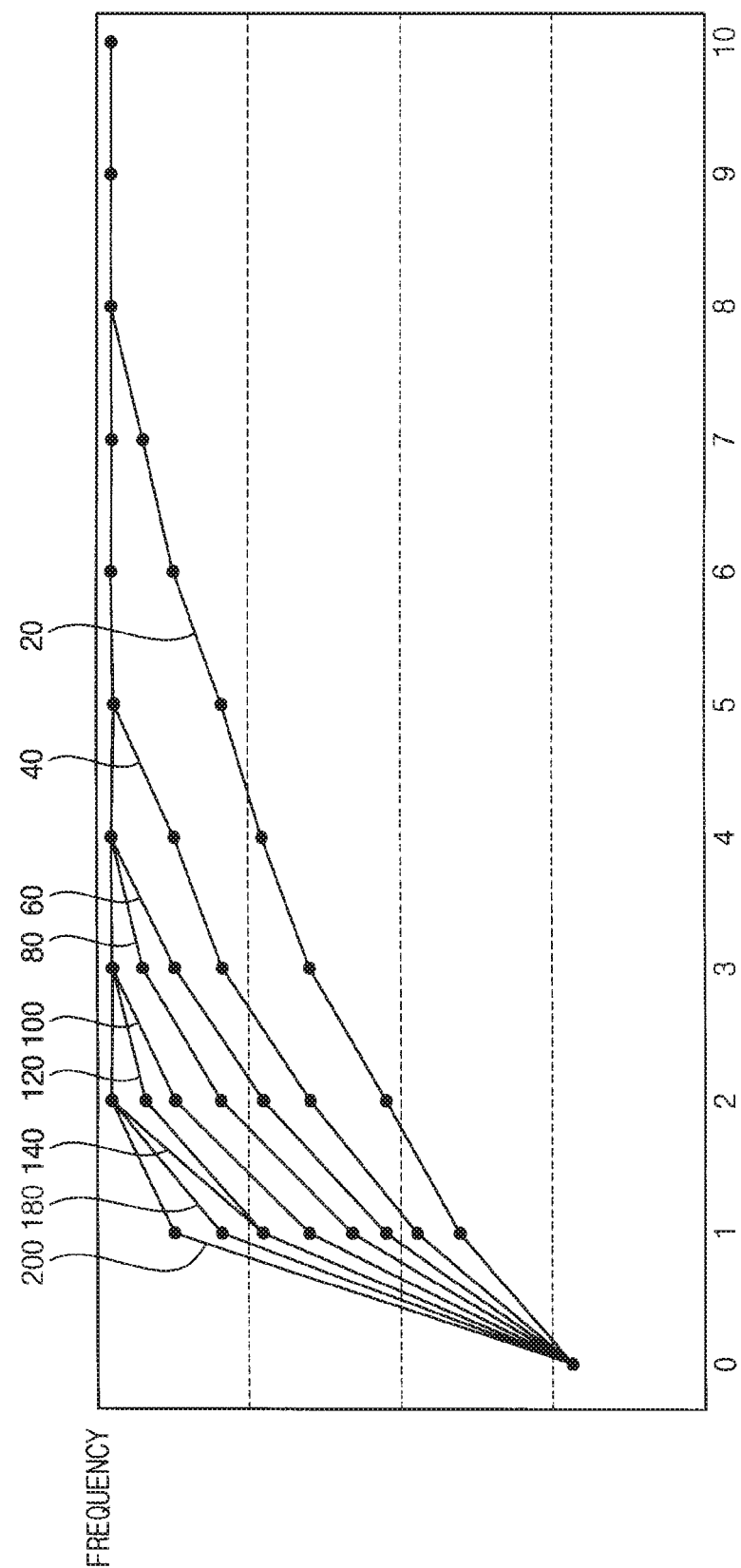
FIG. 6 is a diagram illustrating a power level conversion by a method of performing DVFS according to exemplary embodiments.

FIG. 6 is a diagram illustrating a power level conversion by a method of performing DVFS according to exemplary embodiments.

FIG. 6 shows the ramp-up time, that is, the speed of the power level conversion or the responsiveness, when DVFS is performed based on the common power step PSTc as described with reference to FIGS. 5A through 5C. In FIG. 6, the vertical axis indicates the operation frequency of the available frequency, and the horizontal axis indicates sequential index of the power level conversion.

FIG. 6 illustrates procedures of power level conversions starting from the minimum available frequency corresponding to the minimum power level determined according to the power budget to the maximum available frequency corresponding to the maximum power level, when the workload of the processor is maintained to be sufficiently great beyond the maximum available frequency. The graphs in FIG. 6 correspond to the cases in which the common power step PSTc as described with reference to FIGS. 5A through 5C are 20, 40, 60, 80, 100, 120, 140, 180 and 200, respectively.

For example, in the case of the common power step PSTc of 120, the operation frequency is increased by a relatively large amount by the first conversion, the operation frequency is increased relatively less by the second conversion, and the operation frequency reaches the maximum available frequency by the third conversion. As such, the next operation frequency may be set aggressively in the lower frequency region, and the next operation frequency may be set conservatively in the higher frequency region. Conventionally, the behavior as represented by the graphs in FIG. 6 has been set empirically.

The maximum available frequency is set through the two power level conversions in the case of the common power step PSTc of 200, whereas the maximum available frequency is set through the eight power level conversions in the case of the common power step PSTc of 20. As such, the responsiveness or the speed of the power level conversion may be decreased as the common power step PSTc is decreased.

Graphs may be substantially the same as FIG. 6 in room temperature for the cases of considering the static power in addition to the dynamic power. However, if the power consumption is increased under a high temperature condition, the above-described reference power PWr is decreased, and thus the common power step PSTc is decreased. For example, if the static power and the dynamic power are considered, the ramp-up slope is decreased in comparison with FIG. 6, and thus, the effect of passive cooling to repress the temperature increase without abrupt performance degradation may be expected.

Figure 7:
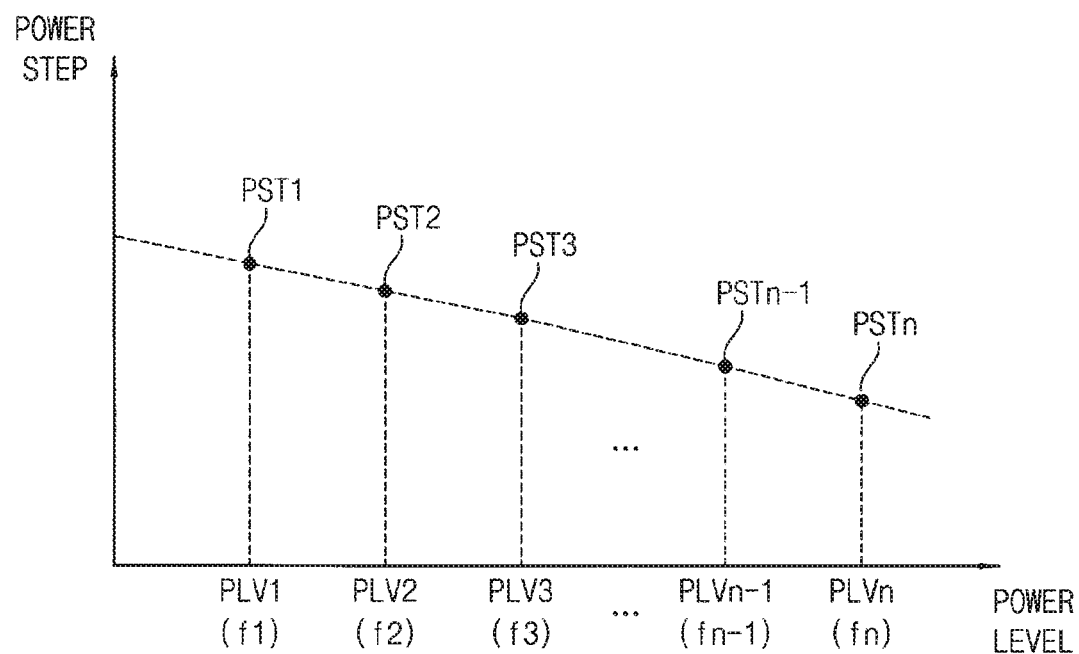
FIG. 7 is a diagram illustrating a method of setting a plurality of power steps according to exemplary embodiments.

FIG. 7 is a diagram illustrating a method of setting a plurality of power steps according to exemplary embodiments.

Referring to FIG. 7, the power step may be decreased as the power level is increased. For example, with respect to an i-th available frequency and an (i+1)-th available frequency among the plurality of available frequencies, an i-th power step corresponding to the i-th available frequency may be set to be smaller than an (i+1)-th power step corresponding to the (i+1)-th available frequency, where i is a natural number.

FIG. 7 illustrates that the power steps PST1~PSTn are decreased linearly as the power levels PLV1~PLVn are increased. However, exemplary embodiments are not limited thereto. For example, according to exemplary embodiments, the power steps PST1~PSTn may be decreased non-linearly as the power levels PLV1~PLVn are increased, or only a portion of the power steps PST1~PSTn may be changed according to the power levels.

As such, the power step may be set differently according to the frequency regions. The ramp-up time may be decreased (that is, the responsiveness or the conversion speed may be increased) in the lower frequency region, and the ramp-up time may be increased in the higher frequency region considering the power budget, the thermal issue, the power consumption, etc. For example, the power step may be set to be relatively great in the lower frequency region and to be relatively small in the higher frequency region.

Figure 8:
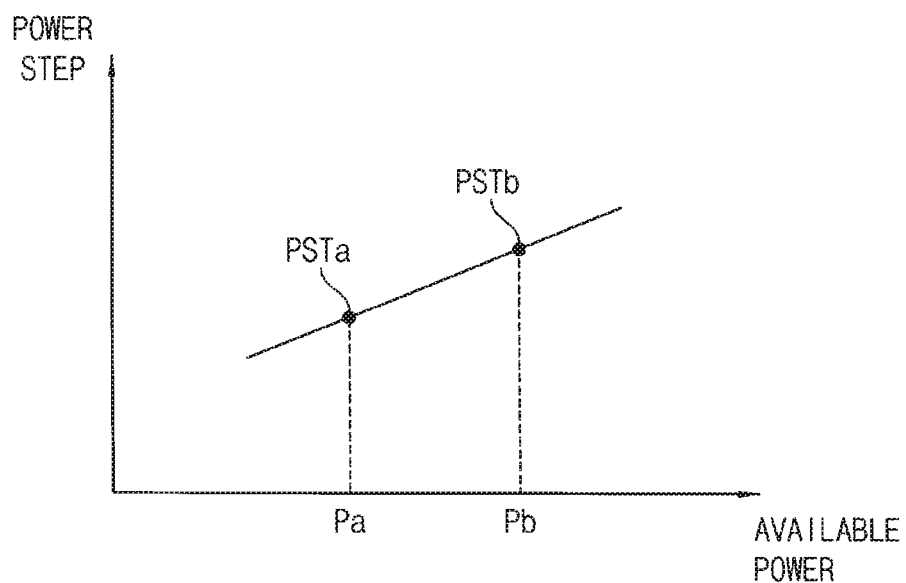
FIG. 8 is a diagram illustrating a method of setting a plurality of power steps based on an available power according to exemplary embodiments.

FIG. 8 is a diagram illustrating a method of setting a plurality of power steps based on an available power according to exemplary embodiments.

Referring to FIG. 8, at least one of a plurality of power steps may be decreased as an available power is decreased. For example, with respect to the same power level, the power step PSTa corresponding to the smaller available power Pa may be set to be smaller than the power step PSTb corresponding to the greater available power Pb.

Figure 9:
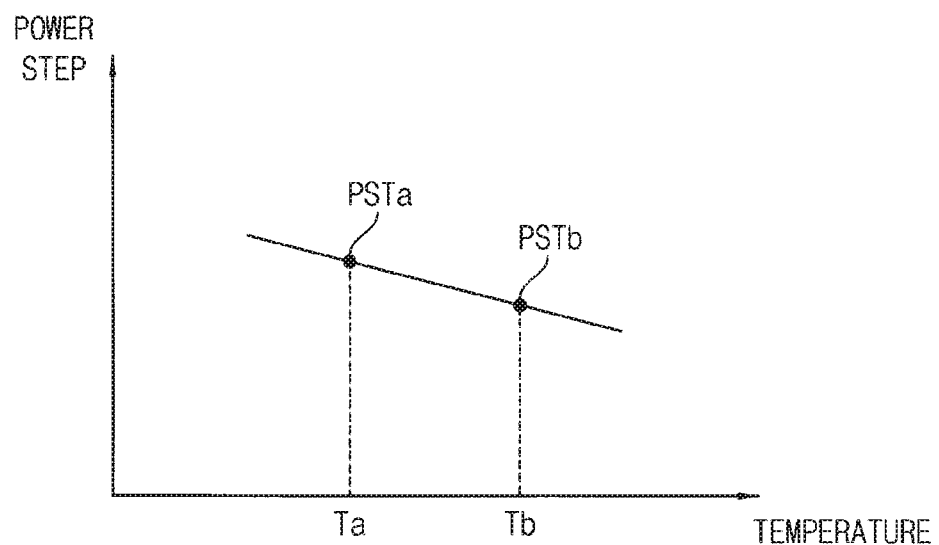
FIG. 9 is a diagram illustrating a method of setting a plurality of power steps based on an operation temperature according to exemplary embodiments.

FIG. 9 is a diagram illustrating a method of setting a plurality of power steps based on an operation temperature according to exemplary embodiments.

Referring to FIG. 9, at least one of a plurality of power steps may be decreased as an operation temperature of the processor increases. For example, with respect to the same power level, the power step PSTa corresponding to the lower temperature Ta may be set to be greater than the power step PSTb corresponding to the higher temperature Tb.

As described with reference to FIGS. 8 and 9, the power step or the energy step may be adjusted based on at least one of the operation temperature of the processor and the available power of the processor. In the case of the common power step PSTc as described above with reference to FIGS. 5A through 5B, the common power step PSTc may be decreased as the value of M is increased and/or the reference power PWr is decreased.

As will be described below with reference to FIGS. 10A and 10B, in the case of a plurality of clock domains operating based on different operation frequencies, the power steps may be set differently with respect to the plurality of clock domains considering various factors such as, for example, energy efficiency.

Figure 10A:
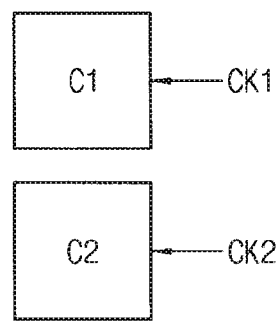
FIGS. 10A and 10B are diagrams illustrating examples of clock domains of a multi-core processor according to exemplary embodiments.
Figure 10B:
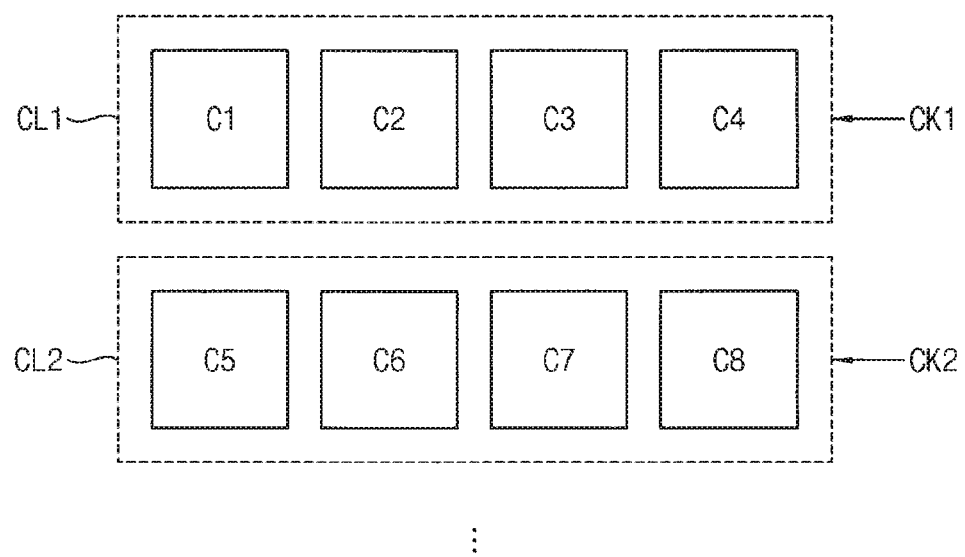
Figure 11A:
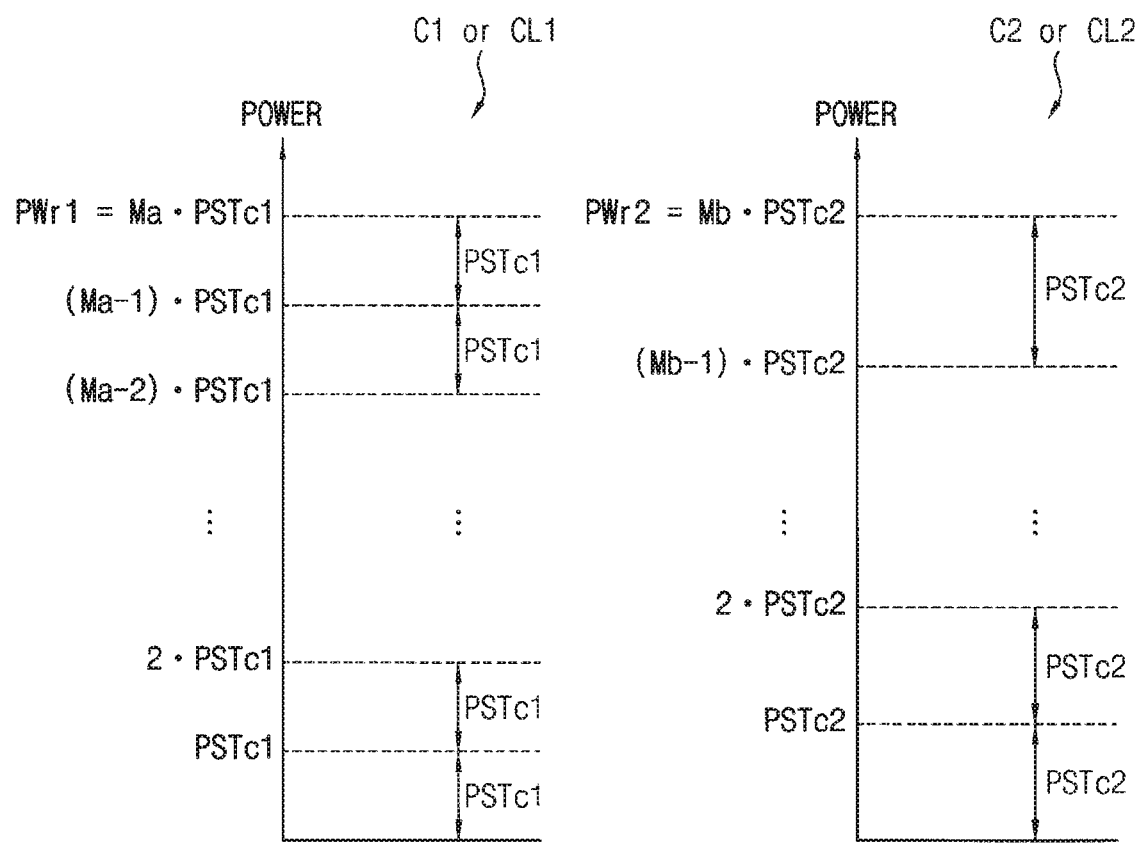
FIGS. 11A and 11B are diagrams illustrating a method of setting a plurality of power steps in a multi-core processor according to exemplary embodiments.
Figure 11B:
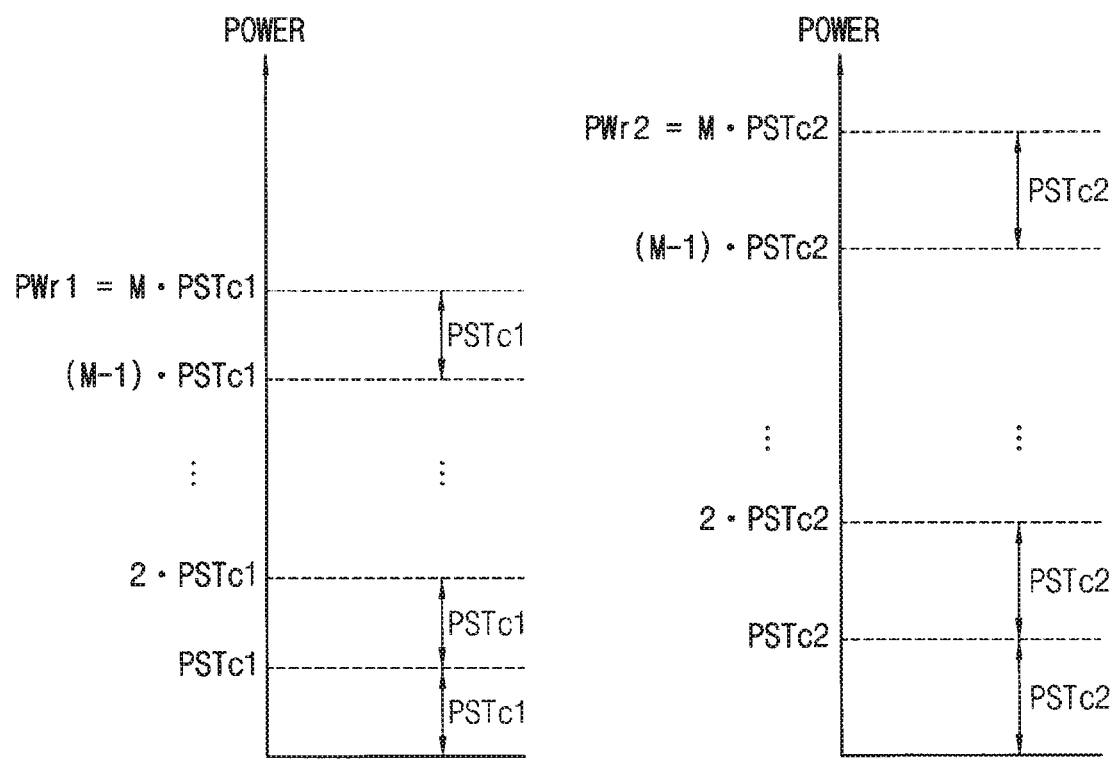

FIGS. 10A and 10B are diagrams illustrating examples of clock domains of a multi-core processor according to exemplary embodiments. FIGS. 11A and 11B are diagrams illustrating a method of setting a plurality of power steps in a multi-core processor according to exemplary embodiments.

Referring to FIG. 10A, a multi-core processor may include a plurality of processor cores operating based on different clock signals. For example, the multi-core processor may include a first processor core C1 operating based on a first clock signal CK1 and a second processor core C2 operating based on a second clock signal CK2. In this case, first core power steps may be set with respect to the first processor core C1, and second core power steps different from the first core power steps may be set with respect to the second processor core C2.

FIGS. 11A and 11B illustrate an exemplary embodiment corresponding to the common power step PSTc as described above with reference to FIGS. 5A through 5C.

Referring to FIG. 11A, the common power step may be set differently by setting the above-described value of M corresponding to the responsiveness criteria or the ramp-up criteria differently per clock domain. The reference power PWr1 corresponding to the first processor core C1 and the reference power PWr2 corresponding to the second processor core C2 may be set to be equal, and the responsiveness criteria Ma corresponding to the first processor core C1 may be set to be greater than the responsiveness criteria Mb corresponding to the second processor core C2, thereby setting the first common power step PSTc1 corresponding to the first processor core C1 to be smaller than the second common power step PSTc2 corresponding to the second processor core C2.

Referring to FIG. 11B, the common power step may be set differently by setting the above-described reference power PWr differently per clock domain. The responsiveness criteria Ma corresponding to the first processor core C1 and the responsiveness criteria Mb corresponding to the second processor core C2 may be set to be equal, and the reference power PWr1 corresponding to the first processor core C1 may be set to be smaller than the reference power PWr2 corresponding to the second processor core C2, thereby setting the first common power step PSTc1 corresponding to the first processor core C1 to be smaller than the second common power step PSTc2 corresponding to the second processor core C2.

Referring to FIG. 10B, a multi-core processor may include a plurality of clusters operating based on different clock signals. For example, the multi-core processor may include a first cluster CL1 including a plurality of processor cores C1~C4 operating based on a first clock signal CK1, and a second cluster CL2 including a plurality of processor core C5~C8 operating based on a second clock signal CK2. In this case, first core power steps may be set with respect to the first cluster CL1 and second core power steps different from the first core power steps may be set with respect to the second cluster CL2.

The different power steps may be set with respect to the first cluster CL1 and the second cluster CL2 as described with reference to FIGS. 11A and 11B, and for convenience of explanation, repeated descriptions are omitted.

Figure 12:
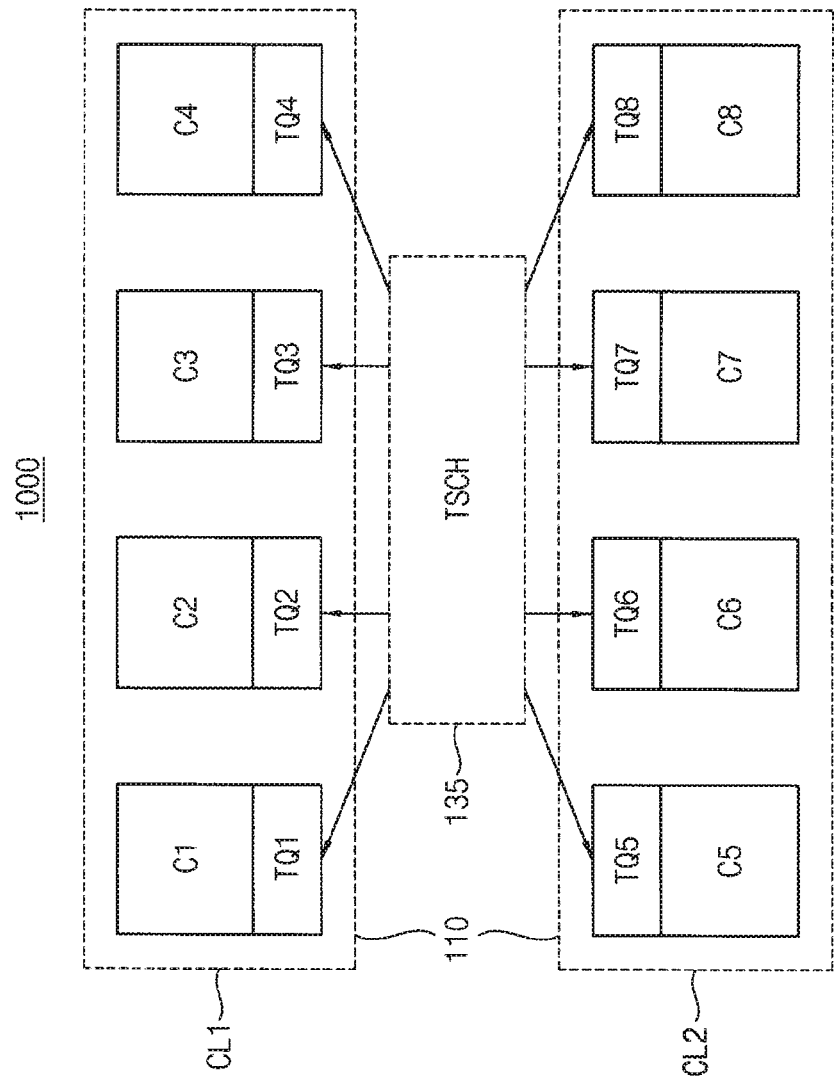
FIG. 12 is a diagram for describing task scheduling applicable to a method of performing DVFS according to exemplary embodiments.

FIG. 12 is a diagram for describing task scheduling applicable to a method of performing DVFS according to exemplary embodiments.

Referring to FIG. 12, a multi-core system 1000 may include a processor 110 and a task scheduler (TSCH) 135. The multi-core system 1000 may include further components. For example, the multi-core system 1000 may correspond to the computing system 1000 illustrated in FIG. 3, and may include the components described with reference to FIG. 3.

The multi-core system 1000 may be implemented as a system-on-chip (SoC) that may be included in various computing devices. The multi-core system 1000 may transmit and receive data, task requests, etc. to and from a host device through an interface. For example, the interface may be connected to the host device via a parallel AT attachment (PATA) bus, a serial AT attachment (SATA) bus, SCSI, USB, PCIe, etc.

The processor 110 may include a plurality of processor cores C1~C8 and a plurality of task queues TQ1~TQ8 respectively assigned to the plurality of processor cores C1~C8. Although FIG. 12 illustrates the multi-core system 1000 as including eight processor cores C1~C8 for convenience of illustration and description, exemplary embodiments are not limited thereto, and the processor 110 may include a various number of processor cores.

The processor cores C1~C8 may be either homogeneous processor cores or heterogeneous processor cores.

When the processor cores C1~C8 are heterogeneous processor cores, they may be sorted into a first cluster CL1 and a second cluster CL2. Among the processor cores C1~C8, the first cluster CL1 may include high-performance cores C1~C4 having a first processing speed, and the second cluster CL2 may include low-performance cores C5~C8 having a second processing speed that is smaller than the first processing speed.

In exemplary embodiments, the processor cores C1~C8 may have per-core dynamic voltage and frequency scaling (DVFS) architecture. In the per-core DVFS architecture, the processor cores C1~C8 may be included in different power domains, and voltages having different levels and clocks having different frequencies may be supplied to the processor cores C1~C8.

In exemplary embodiments, the processor cores C1~C8 may have per-cluster DVFS architecture. In the per-cluster DVFS architecture, the first cluster CL1 and the second cluster CL2 may be included in different power domains, and voltages having different levels and clocks having different frequencies may be supplied to the clusters CL1 and CL2.

Power supplied to the processor cores C1~C8 may be blocked by a hotplug scheme, respectively. For example, a portion of the processor cores C1~C8 may execute assigned tasks and the power to the other portion of the processor cores C1~C8 in an idle state may be blocked. In contrast, when the workload is too heavy for the powered processor cores, the power may be supplied to at least one of the processor cores in the idle state to execute the tasks.

The task scheduler 135 may be implemented as hardware, software or a combination of hardware and software. It will be understood that the software may be a computer program product embodied in one or more computer readable medium(s) having computer readable program code embodied thereon. The computer readable program code may be provided to a processor of a general purpose computer, special purpose computer, or other programmable data processing apparatus, and may be executed by the processor to implement the tasks of the computer readable program code. The computer readable medium may be a computer readable signal medium or a computer readable storage medium. The computer readable storage medium may be any tangible medium that can contain or store a program for use by or in connection with an instruction execution system, apparatus, or device.

The task scheduler (TSCH) 135 may perform task scheduling to assign or locate the tasks to the task queues TQ1~TQ8. The task queue may be implemented as hardware within the processor core or a data structure included in a kernel of an operation system (OS). The task queue may be referred to as a run queue.

Figure 13:
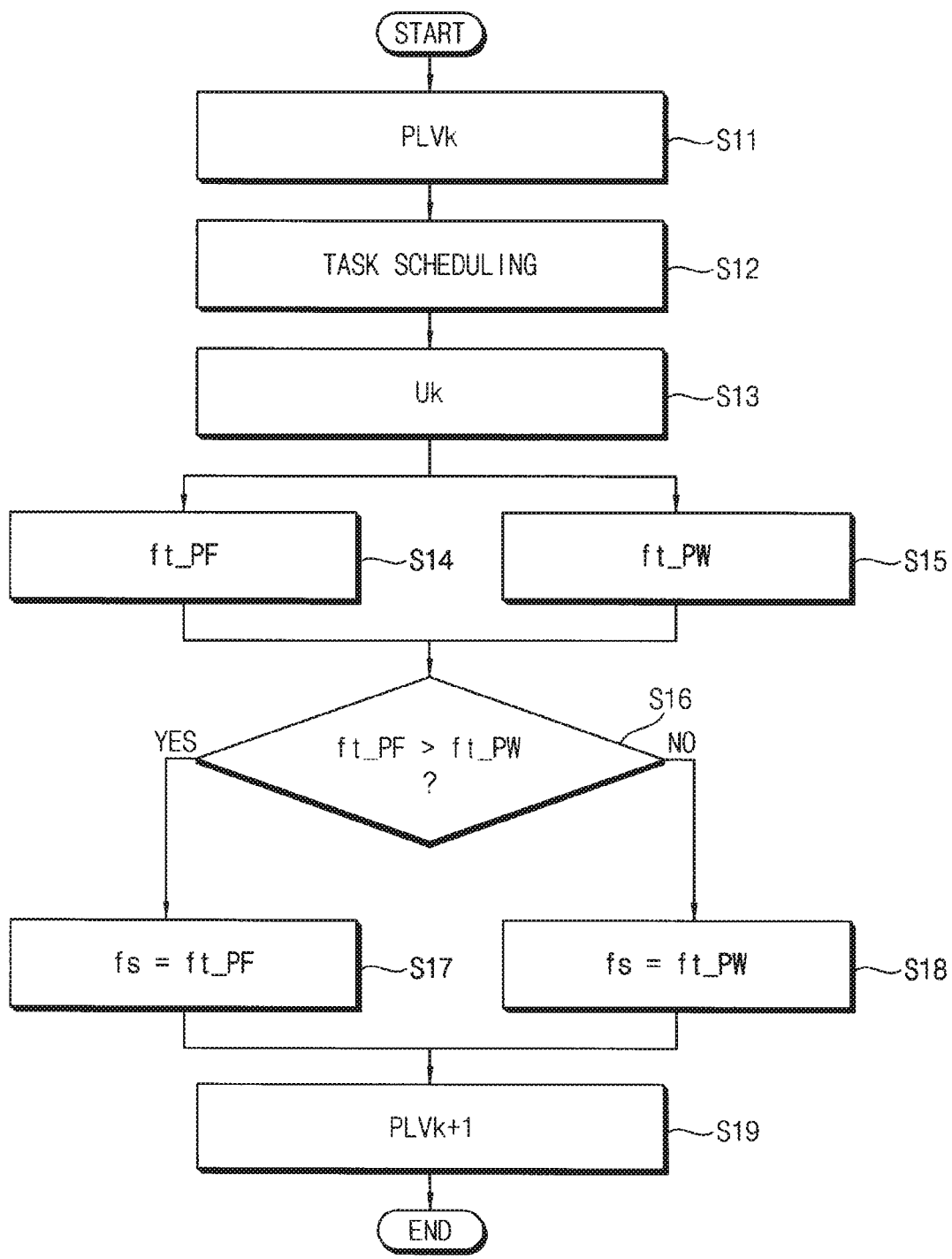
FIG. 13 is a flowchart illustrating a method of converting a power level in a multi-core processor according to exemplary embodiments.

FIG. 13 is a flowchart illustrating a method of converting a power level in a multi-core processor according to exemplary embodiments.

Referring to FIG. 13, the current power level PLVk may be set based on the power step (S11) as described above. Task scheduling may be performed to assign a plurality of tasks to a plurality of processor cores (S12). The current utilization Uk corresponding to the task scheduling may be provided (S13).

A performance target frequency ft_PF may be determined based on the current utilization Uk and a current available frequency corresponding to a current power level determined among the plurality of power levels (S14). In exemplary embodiments, as described above with reference to Expression 4 and Expression 5, the performance target frequency ft_PF may be set to a multiplication value of the current available frequency, the current utilization and the margin rate.

A power target frequency ft_PW may be determined based on the current power step PSTk corresponding to the current power level and the current utilization Uk. (S15). In exemplary embodiments, as described above with reference to Expression 6, a maximum power at the current power level may be determined, a margin power may be determined to be a sum of the maximum power and the current power step, a target power may be set to a multiplication value of the margin power and the current utilization, and the power target frequency ft_PW may be set to the target power.

Even though FIG. 13 illustrates that the determination of the performance target frequency ft_PF (S14) and the determination of the power target frequency ft_PW (S15) are performed in parallel, exemplary embodiments are not limited thereto. For example, in an exemplary embodiment, the determination of the performance target frequency ft_PF (S14) and the determination of the power target frequency ft_PW (S15) may be performed sequentially.

The performance target frequency ft_PF and the power target frequency ft_PW may be compared (S16). When the performance target frequency ft_PF is greater than the power target frequency ft_PW (S16: YES), the performance target frequency ft_PF may be determined as a selected frequency fs (S17). Alternatively, when the performance target frequency ft_PF is not greater than the power target frequency ft_PW (S16: NO), the power target frequency ft_PW may be determined as the selected frequency fs (S18). A next power level PLVk+1 may be determined (S19) from among the plurality of power levels based on the selected frequency fs corresponding to a greater one of the performance target frequency ft_PF and the power target frequency ft_PW.

Figure 14:
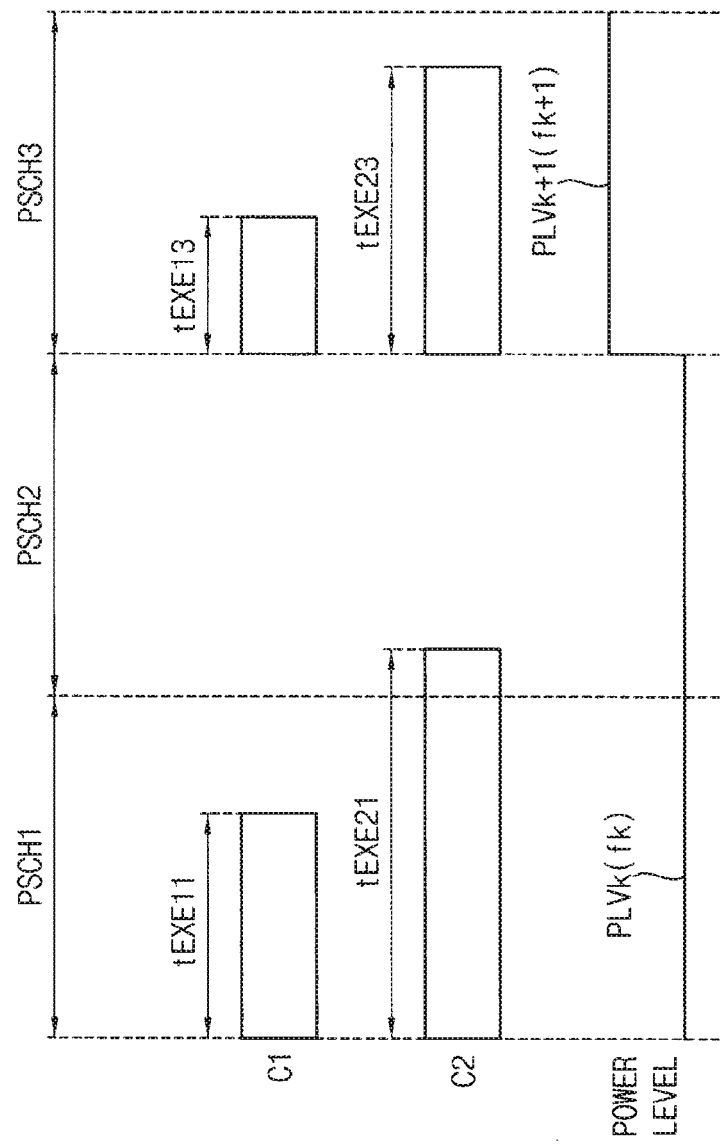
FIGS. 14 and 15 are diagrams illustrating a method of performing DVFS associated with task scheduling according to exemplary embodiments.
Figure 15:
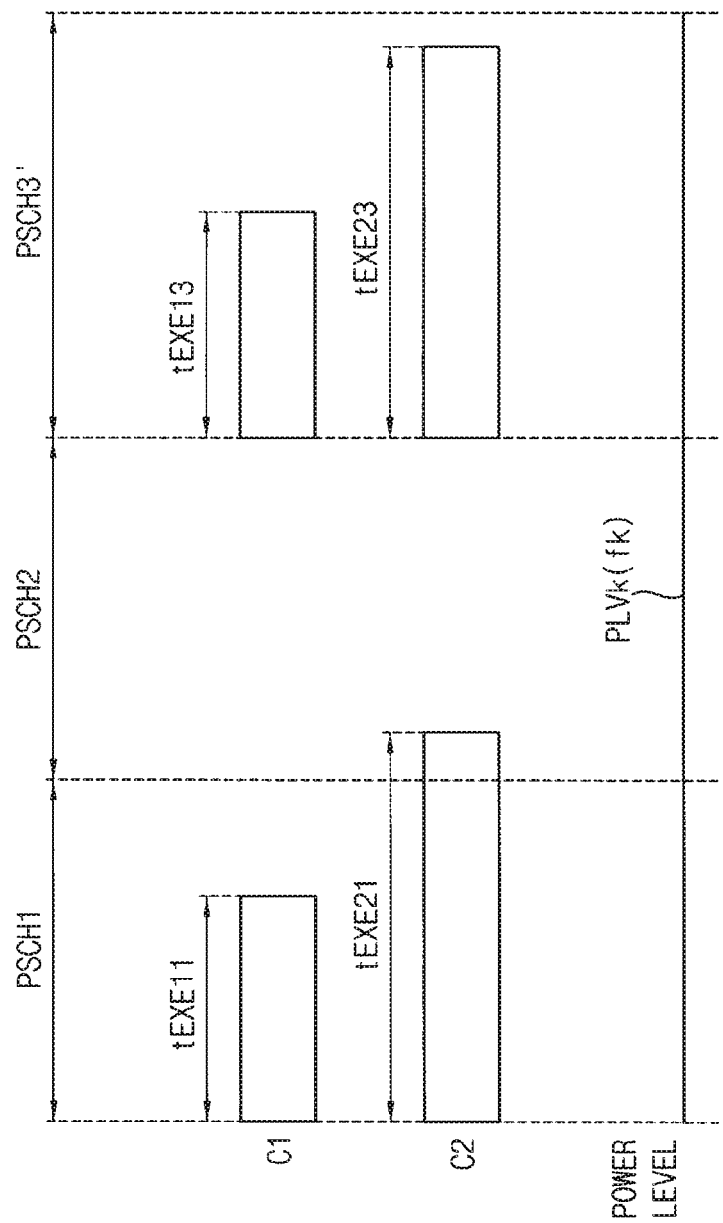

FIGS. 14 and 15 are diagrams illustrating a method of performing DVFS associated with task scheduling according to exemplary embodiments.

As illustrated in FIGS. 14 and 15, a core execution time tEXE11 of a first processor core C1 in a first scheduling period PSCH1 may be within a maximum execution time, but a core execution time tEXE21 of a second processor core C2 in the first scheduling period PSCH1 may exceed the maximum execution time. The first processor core C1 and the second processor core C2 may be included in the same clock domain. In this case, a core execution delay may be caused such that the tasks assigned to the second processor core C2 are not completed in the first scheduling period PSCH1, and the above-described task scheduler cannot perform the task scheduling for a second scheduling period PSCH2.

In exemplary embodiments, as illustrated in FIG. 14, when the core execution delay is caused with respect to the processor cores C1 and C2 in the same clock domain, the DVFS may be performed based on the power step as described above to increase or raise the power level of the processor cores C1 and C2. For example, the power level in a third scheduling period PSCH3 may be increased from a power level PLVk corresponding to an operation frequency fk to a power level PLVk+1 corresponding to an operation frequency fk+1. Core execution times tEXE13 and tEXE23 in the third scheduling period PSCH3 may be decreased to be shorter than the core execution times tEXE11 and tEXE21 in the first scheduling period PSCH1, and thus, the assigned tasks to the processor cores C1 and C2 may be completed within the maximum execution time.

In exemplary embodiments, as illustrated in FIG. 15, when the core execution delay is caused with respect to the processor cores C1 and C2 in the same clock domain, the DVFS may be performed based on the power step as described above to increase or raise the power level of the processor cores C1 and C2. For example, while the power level PLVk corresponding to the operation frequency fk may be maintained in a third scheduling period PSCH3', the time interval of the third scheduling period PSCH3' may be prolonged to execute the assigned tasks with the maximum execution time.

FIG. 16 is a diagram illustrating effects of a method of performing DVFS according to exemplary embodiments.

FIG. 16 illustrates an improvement rate PSF of performance and power consumption of the DVFS based on the power step according to exemplary embodiments in comparison with a conventional DVFS based on the performance step, when several benchmark applications GEEKBENCH Single, GEEKBENCH Multi, PCMARK, and AppLaunch are executed in a mobile device.

In FIG. 16, CPER indicates a processor performance, UXPER indicates a user experience performance, and DoU indicates a battery duration time.

The benchmark applications GEEKBENCH Single and GEEKBENCH multi execute heavy and continuous workloads with one task per processor core. The benchmark application PCMARK is very similar to a real user scenario in which a photo or video are presented, and represents the user experience performance. The benchmark application AppLaunch is for measuring a launching time of a certain application in a certain mobile device.

As illustrated in FIG. 16, the battery duration time is slightly increased, but the user experience performance is significantly improved.

The responsiveness quality may be determined depending on the ramp-up time in a lower frequency region, where the ramp-up time corresponds to a time taken for increasing the operation frequency. The ramp-up speed may be increased without manual tuning in the lower frequency region by the method of performing DVFS based on the power step according to exemplary embodiments.

In the higher frequency region, the ramp-speed is decreased due to power and thermal issues. The ramp-up speed may be decreased without manual tuning in the higher frequency region by the method of performing DVFS based on the power step according to exemplary embodiments.

When the maximum frequency is limited because of the power and thermal issues, only the power step may be adjusted to control the ramp-up speed continuously. Conventional schemes clamp only the maximum frequency. In this case, the DVFS may work normally up to the clamping frequency, but the performance may be stalled beyond the clamping frequency.

As described above, a method of performing the DVFS and a computing system performing the method according to exemplary embodiments may control performance and power consumption of a processor efficiently by performing power level conversion based on the power step.

Exemplary embodiments of the disclosure may be applied to any devices and systems requiring management of performance of power. For example, exemplary embodiments may be applied to systems such as a memory card, a solid state drive (SSD), an embedded multimedia card (eMMC), a universal flash storage (UFS), a mobile phone, a smartphone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an Internet of Things (IoT) device, an Internet of Everything (IoE) device, an e-book, a virtual reality (VR) device, an augmented reality (AR) device, etc.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A method of performing dynamic voltage and frequency scaling (DVFS), the method comprising:
setting a plurality of power levels corresponding to a plurality of available frequencies of a clock signal for an operation of a processor,
wherein each of the plurality of power levels indicates a degree of power consumption and performance of the processor;
setting a plurality of power steps corresponding to the plurality of available frequencies,
wherein each of the plurality of power steps indicates an amount of power change corresponding to an amount of frequency change; and
controlling a conversion between the plurality of power levels based on a utilization of the processor and the plurality of power steps.

2. The method of claim 1, wherein controlling the conversion comprises:
determining a power target frequency based on a current utilization of the processor and a current power step corresponding to a current power level determined from among the plurality of power levels; and
determining a next power level from among the plurality of power levels based on the power target frequency.

3. The method of claim 2, wherein determining the power target frequency comprises:
determining a maximum power at the current power level;
determining a margin power corresponding to a sum of the maximum power and the current power step;
determining a target power corresponding to a multiplication value of the margin power and the current utilization; and
providing the power target frequency corresponding to the target power.

4. The method of claim 2, wherein determining the next power level comprises:
determining a plurality of candidate frequencies from among the plurality of available frequencies, wherein each of the candidate frequencies is greater than the power target frequency; and
determining the next power level corresponding to a minimum frequency from among the candidate frequencies.

5. The method of claim 1, wherein setting the plurality of power steps comprises:
setting a common power step corresponding to the plurality of available frequencies.

6. The method of claim 5, wherein setting the common power step comprises:
setting a reference power; and
setting the common power step to be equal to the reference power divided by M, where M is a natural number.

7. The method of claim 6, further comprising:
controlling a speed of the conversion by adjusting a value of M.

8. The method of claim 7, wherein the speed of the conversion is decreased as the value of M is increased.

9. The method of claim 6, wherein setting the reference power comprises:
changing the reference power based on at least one of an operation temperature of the processor and an available power of the processor.

10. The method of claim 1, wherein setting the plurality of power steps comprises:
with respect to an i-th available frequency and an (i+1)-th available frequency from among the plurality of available frequencies, setting an i-th power step corresponding to the i-th available frequency to be smaller than an (i+1)-th power step corresponding to the (i+1)-th available frequency, where i is a natural number.

11. The method of claim 1, wherein setting the plurality of power steps comprises:
decreasing at least one of the plurality of power steps as an available power of the processor decreases.

12. The method of claim 1, wherein setting the plurality of power steps comprises:
decreasing at least one of the plurality of power steps as an operation temperature of the processor increases.

13. The method of claim 1, wherein the processor is a multi-core processor comprising a first processor core operating based on a first clock signal and a second processor core operating based on a second clock signal.

14. The method of claim 13, wherein setting the plurality of power steps comprises:

setting a plurality of first core power steps with respect to the first processor core; and setting a plurality of second core power steps different from the first core power steps with respect to the second processor core.

15. The method of claim 1, wherein the processor is a multi-core processor comprising a first cluster of first processor cores operating based on a first clock signal and a second cluster of second processor cores operating based on a second clock signal.

16. The method of claim 15, wherein setting the plurality of power steps comprises:

setting a plurality of first core power steps with respect to the first cluster; and setting a plurality of second core power steps different from the first core power steps with respect to the second cluster.

17. The method of claim 1, wherein the processor is a multi-core processor comprising a plurality of processor cores, and wherein controlling the conversion comprises:

determining a performance target frequency based on a current utilization of the processor and a current available frequency corresponding to a current power level determined from among the plurality of power levels, wherein the current utilization corresponds to a task scheduling operation that assigns a plurality of tasks to the plurality of processor cores;

determining a power target frequency based on a current power step corresponding to the current power level and the current utilization; and determining a next power level from among the plurality of power levels based on a selected frequency corresponding to a greater one of the performance target frequency and the power target frequency.

18. The method of claim 17, wherein determining the performance target frequency comprises:

providing the performance target frequency corresponding to a multiplication value of the current available frequency, the current utilization and a margin rate, and wherein determining the power target frequency comprises:

determining a maximum power at the current power level;

determining a margin power corresponding to a sum of the maximum power and the current power step;

determining a target power corresponding to a multiplication value of the margin power and the current utilization; and providing the power target frequency corresponding to the target power.

19. A computing system, comprising:

a processor comprising at least one processor core;

a power management circuit configured to provide a clock signal and a voltage for an operation of the processor; and a memory storing a dynamic voltage and frequency scaling (DVFS) computer program, wherein the processor is configured to execute the DVFS computer program to:

set a plurality of power levels corresponding to a plurality of available frequencies of the clock signal for the operation of the processor, wherein each of the plurality of power levels indicates a degree of power consumption and performance of the processor;

set a plurality of power steps corresponding to the plurality of available frequencies, wherein each of the plurality of power steps indicates an amount of power change corresponding to an amount of frequency change; and control a conversion between the plurality of power levels based on a utilization of the processor and the plurality of power steps.

20. A method of performing dynamic voltage and frequency scaling (DVFS), the method comprising:

setting a plurality of power levels corresponding to a plurality of available frequencies of a clock signal for an operation of a processor, wherein each of the plurality of power levels indicates a degree of power consumption and performance of the processor;

setting a plurality of power steps corresponding to the plurality of available frequencies based on at least one of an operation temperature of the processor and an available power of the processor, wherein each of the plurality of power steps indicates an amount of power change corresponding to an amount of frequency change;

determining a power target frequency based on a current utilization of the processor and a current power step corresponding to a current power level determined from among the plurality of power levels; and determining a next power level from among the plurality of power levels based on the power target frequency.

* * * * *